United States Patent
Uejo

(10) Patent No.: US 7,697,153 B2
(45) Date of Patent: Apr. 13, 2010

(54) PRINT MANAGEMENT DEVICE, PRINT MANAGEMENT METHOD, PRINT MANAGEMENT STORAGE MEDIUM, AND PRINT SYSTEM

(75) Inventor: Hiroyoshi Uejo, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1209 days.

(21) Appl. No.: 10/953,185

(22) Filed: Sep. 30, 2004

(65) Prior Publication Data

US 2005/0212904 A1 Sep. 29, 2005

(30) Foreign Application Priority Data

Mar. 24, 2004 (JP) .............................. 2004-087092

(51) Int. Cl.
*G06F 15/00* (2006.01)
(52) U.S. Cl. .................... 358/1.15; 358/1.13; 358/1.18; 358/402; 358/403; 358/406; 709/201; 709/203; 709/217; 709/220; 709/223; 70/2; 70/3; 70/14; 70/80
(58) Field of Classification Search ................ 358/1.15, 358/1.13, 1.18, 403, 406, 402; 399/361; 705/2, 3, 14, 80; 709/225, 201, 203, 217, 709/223, 226, 220, 249
See application file for complete search history.

(56) References Cited

U.S. PATENT DOCUMENTS

| | | | | |
|---|---|---|---|---|
| 5,353,388 | A * | 10/1994 | Motoyama | ................... 358/1.18 |
| 5,493,635 | A * | 2/1996 | Brindle et al. | ............... 358/1.15 |
| 5,625,757 | A * | 4/1997 | Kageyama et al. | .......... 358/1.14 |
| 6,031,631 | A * | 2/2000 | Tahara et al. | ................ 358/296 |
| 6,407,820 | B1 | 6/2002 | Hansen et al. | |
| 6,577,407 | B1 * | 6/2003 | Kopecki | .................... 358/1.15 |
| 7,092,963 | B2 * | 8/2006 | Ryan et al. | ................ 707/104.1 |
| 7,561,290 | B2 * | 7/2009 | Uejo | .......................... 358/1.15 |
| 7,567,360 | B2 * | 7/2009 | Takahashi et al. | ........... 358/1.15 |
| 2002/0022900 | A1 | 2/2002 | Honda | |
| 2002/0054314 | A1 * | 5/2002 | Takahashi | .................. 358/1.13 |

(Continued)

FOREIGN PATENT DOCUMENTS

EP 0 963 104 A1 12/1999

(Continued)

OTHER PUBLICATIONS

CIP4organization, "JDF Specification", 2000-2002, Release 1.1 Rev A, www.cip4.org.*

(Continued)

*Primary Examiner*—Twyler L Haskins
*Assistant Examiner*—Dennis Dicker
(74) *Attorney, Agent, or Firm*—Oliff & Berridge, PLC

(57) ABSTRACT

In a print system which processes a print job on the basis of a print instruction in which request items in print processes for obtaining a printed matter are described in a predetermined description format, a print management device manages print processings for the printed matter. The print management device includes a detection unit that detects a connection state of a processing device for executing a predetermined process among the request items included in the print instructions, and a selection unit that selects a print instruction of a description format corresponding to the connected processing device to output the print instruction to the processing device.

30 Claims, 8 Drawing Sheets

U.S. PATENT DOCUMENTS

2002/0057455 A1* 5/2002 Gotoh et al. ............... 358/1.15
2004/0190042 A1* 9/2004 Ferlitsch et al. ............ 358/1.15
2007/0242303 A1* 10/2007 Barry et al. ................ 358/1.15

FOREIGN PATENT DOCUMENTS

| | | |
|---|---|---|
| JP | A-10-320136 | 12/1998 |
| JP | A-2000-25191 | 1/2000 |
| JP | A-2002-41115 | 2/2002 |
| JP | A 2002-113971 | 4/2002 |
| JP | A-2002-169735 | 6/2002 |
| JP | A-2003-533825 | 11/2003 |

OTHER PUBLICATIONS

Dec. 1, 2009 Office Action issued in Japanese Application No. 2004-087092.

* cited by examiner

FIG. 4A

| PRINTED MATTER SPECIFICATION |
| PLATE-MAKING PROCESS |
| PRINT PROCESS |
| FOLDING PROCESS |
| CUTTING PROCESS |
| BINDING PROCESS |
| DELIVERY PROCESS |

| PRINTED MATTER SPECIFICATION<br>• CONFIGURATION<br>• PAPER QUALITY<br>• SIZE<br>• THE NUMBER OF COPIES<br>• OTHERS |
| PLATE-MAKING PROCESS<br>• UNDEFINED |
| PRINT PROCESS<br>• UNDEFINED |
| FOLDING PROCESS<br>• UNDEFINED |
| CUTTING PROCESS<br>• UNDEFINED |
| BINDING PROCESS<br>• UNDEFINED |
| DELIVERY PROCESS<br>• DELIVERY DESTINATION<br>• DELIVERY DUE DATE |

FIG. 4C

| PRINTED MATTER SPECIFICATION<br>• CONFIGURATION<br>• PAPER QUALITY<br>• SIZE<br>• THE NUMBER OF COPIES<br>• OTHERS |
| PLATE-MAKING PROCESS<br>• DEVICE TO BE USED<br>• PROCESS DUE DATE |
| PRINT PROCESS<br>• DEVICE TO BE USED<br>• INK TO BE USED |
| FOLDING PROCESS<br>• DEVICE TO BE USED<br>• PROCESS DUE DATE |
| CUTTING PROCESS<br>• DEVICE TO BE USED<br>• PROCESS DUE DATE |
| BINDING PROCESS<br>• DEVICE TO BE USED<br>• PROCESS DUE DATE |
| DELIVERY PROCESS<br>• DELIVERY DESTINATION<br>• DELIVERY DUE DATE |

FIG. 4D

| PLATE-MAKING PROCESS<br>• IMPOSITION SPECIFICATION<br>• RIP PROCEDURE<br>• DEVICE SETTING |
| PRINT PROCESS<br>• DEVICE SETTING<br>• INK SETTING |
| FOLDING PROCESS<br>• DEVICE SETTING<br>• FOLDING PROCEDURE |
| CUTTING PROCESS<br>• DEVICE SETTING<br>• CUTTING PROCEDURE |
| BINDING PROCESS<br>• DEVICE SETTING<br>• BINDING PROCEDURE |

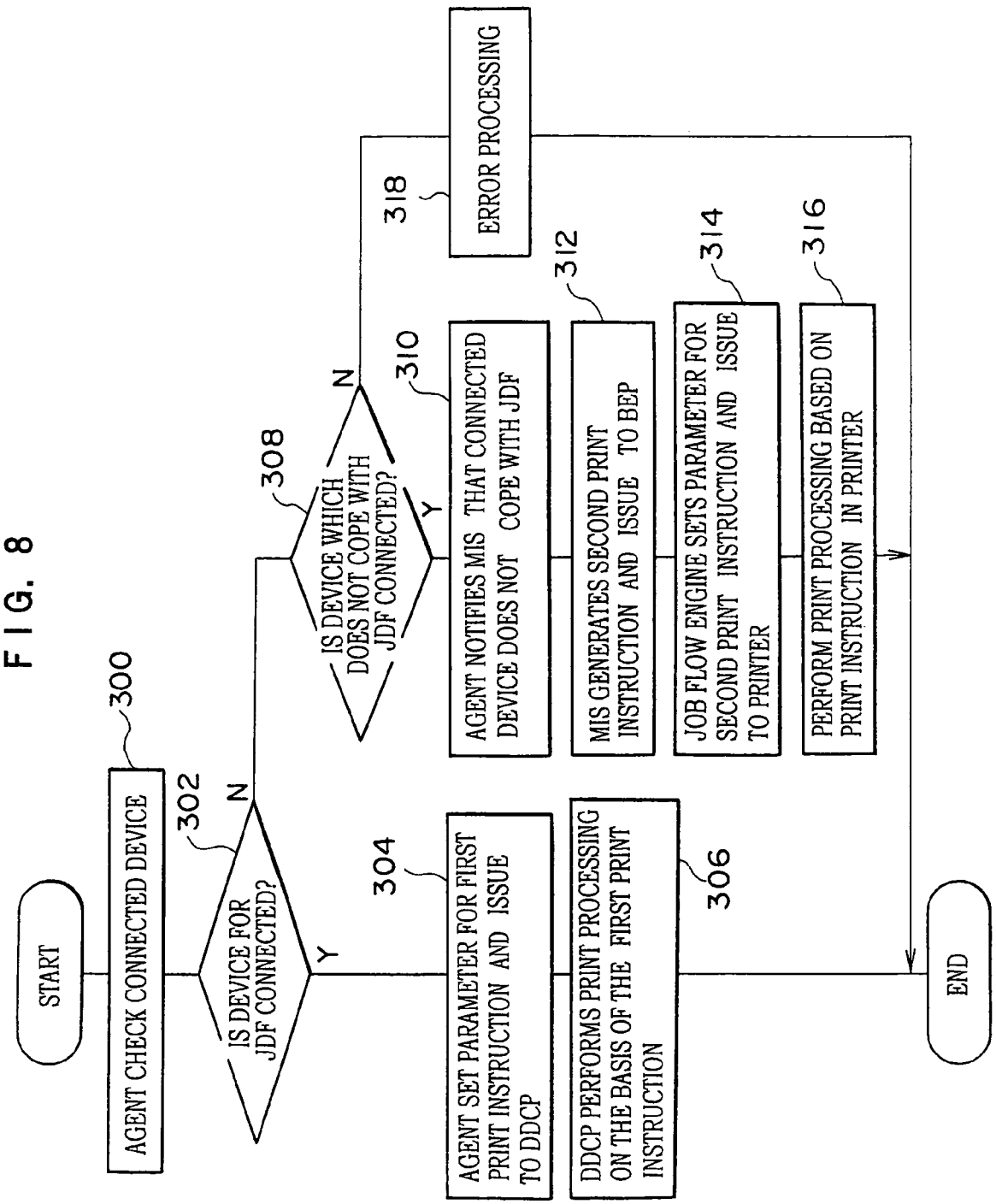

PRINT MANAGEMENT DEVICE, PRINT MANAGEMENT METHOD, PRINT MANAGEMENT STORAGE MEDIUM, AND PRINT SYSTEM

CROSS-REFERENCE TO RELATED APPLICATION

This application claims priority under 35 USC 119 from Japanese Patent Application No. 2004-87092, the disclosure of which is incorporated by reference herein.

BACKGROUND OF THE INVENTION

1. Field of the Invention

The present invention relates to a print management device, a print management method, a print management storage medium, and a print system. More specifically, the invention relates to a print management device, a print management method, a print management storage medium, and a print system in a system which performs printing including plural print processes using, e.g., a machine (press) plate or an image forming device having a so-called print function for forming an image on a recording medium by a printer or the like of an electrophotographic scheme or the like.

2. Description of the Related Art

In conventional printing (for example, offset printing), intermediate products such as printing paper for a photo composition or the like (photographic printing paper), a block copy, a halftone negative, halftone positive, and a PS plate (printing plate) are generated. On the basis of the intermediate products, printing, book binding, and the like are performed.

As shown in FIG. 7, for example, print processes are constituted by an imposition process, an RIP process, a CTP process, a printing machine process, a folding machine process, a cutting machine process, and a binding machine process. The imposition process is a process of determining an image position obtained by a layout, and the RIP process is a process of forming image data for printing on the basis of layout data. The CTP process is a process of forming a printing plate from image data, and the printing machine process is a process of performing printing using a printing plate. The folding machine process is a process of folding a printed medium depending on specifications, the cutting machine process is a process of cutting the printed and folded medium according to the specifications, and the binding machine process is a process of binding the printed, folded, and cut medium depending on the specifications. These print processes are independently performed, and include independent processes performed in the steps.

In recent years, along with the popularization of DTP (DeskTop Publishing/Plate-making), "direct printing" or "on-demand printing" which directly performs printing from DTP data is known. In DTP, the following print processing is prevalent. That is, print data obtained by processing a page layout on a computer is formed on photographic printing paper, a process film, or the like, and, on the basis of these papers or films, a printing plate is formed to perform printing. Further, a CTP (Computer To Plate) process which directly forms a printing plate by electronic data without generating intermediate products is attracting attention. As a device which can be used in such print processing, an image forming device such as a printer or a copying machine having a print function is known.

However, although this DTP makes it possible to perform some processes of printing of peripheral devices of the image forming device by circulation of electronic data, it cannot be used in all processes of the print processing. In addition, DTP cannot be easily applied to conventional print processes.

As a control method for automating a print work flow, CIP4 proposed by Heidelberger Druckmaschinen AG is known. Not only a printer vender but also prepress and postpress processes have been compatible with CIP4. In this manner, abstract instruction to detailed instruction for a device, image processing, and operations are given to half-automate print processes which are manually performed in a conventional technique.

In recent years, as shown in digital color proofing or on-demand printing, merging of printing techniques and electrophotographic techniques is observed. However, since work flows of these techniques are different from each other, at present, instructions are given to the devices by independent standards when these techniques are automated.

SUMMARY OF THE INVENTION

The present invention has been made in consideration of the above circumstances and provides a print management device, a print management method, a print management storage medium, and a print system which can merge a print system including plural print processes such as a process of using a printing plate with an image forming system, achieved by a printer or the like of an electrophotographic scheme, for forming an image on the recording medium.

A first aspect of the invention is to provide a print management device which, in a print system which processes a print job on the basis of print instructions in which request items in print processes for obtaining a printed matter are described in a predetermined description format, manages print processings for the printed matter, the device including: a detection unit that detects a connection state of a processing device that executes a predetermined process among the request items included in the print instructions; and a selection unit that selects a print instruction of a description format corresponding to the connected processing device to output the print instruction to the processing device.

A second aspect of the invention is to provide a print management device which, in a print system which processes a print job on the basis of a first print instruction in which request items in print processes for obtaining a printed matter are described in a first description format or a second print instruction in which request items are described in a second description format different from the first description format, manages print processing for the printed matter, the device including: a detection unit that detects a connection state of a first processing device which interprets the first print instruction to execute a predetermined process among the request items included in the first print instruction and a second processing device which interprets the second print instruction to execute a predetermined process among the request items included in the second print instruction; and a selection unit for outputting the first print instruction to the first processing device when the first processing device is connected, and that requests the second print instruction to an output device which outputs the first print instruction and outputs the second print instruction corresponding to the first print instruction in response to a request and outputs the second print instruction received from the output device to the second processing device when the second processing device is connected.

A third aspect of the invention is to provide a print management method for managing print processing for a printed matter in a print system which processes a print job on the basis of a print instruction in which request items in print processes for obtaining a printed matter are described in a predetermined description format, the method including: detecting a connection state of a processing device for executing a predetermined process among the request items included in the print instruction; and selecting a print instruction of a description format corresponding to the connected processing device to output the print instruction to the processing device.

A fourth aspect of the invention is to provide a method for managing print processing for a printed matter in a print system which processes a print job on the basis of a first print instruction in which request items in print processes for obtaining the printed matter are described in a first description format or a second print instruction in which request items are described in a second description format different from the first description format, the method including: detecting a connection state of a first processing device which interprets the first print instruction to execute a predetermined process among the request items included in the first print instruction and a second processing device which interprets the second print instruction to execute a predetermined process among the request items included in the second print instruction; and outputting the first print instruction to the first processing device when the first processing device is connected, and requesting the second print instruction from an output device which outputs the first print instruction and outputs the second print instruction corresponding to the first print instruction in response to a request and outputting the second print instruction received from the output device to the second processing device when the second processing device is connected.

A fifth aspect of the invention is to provide a method for managing print processing for a printed matter in a print system which processes a print job on the basis of a first print instruction in which request items in print processes for obtaining the printed matter are described in a first description format or a second print instruction in which request items are described in a second description format different from the first description format, the method including: detecting a connection state between a first processing device which interprets the first print instruction to execute a predetermined process among the request items included in the first print instruction and a second processing device which interprets the second print instruction to execute a predetermined process among the request items included in the second print instruction; and outputting the first print instruction to the first processing device when the first processing device is connected, and converting the first print instruction into the second print instruction and outputting the second print instruction to the second processing device when the second processing device is connected.

A sixth aspect of the invention is to provide a computer readable storage medium in which, in a print system which processes a print job on the basis of a print instructions in which request items in print processes for obtaining a printed matter are described in a predetermined description format, the storage medium storing a print management program executable by a computer to perform a processing of managing print processings for the printed matter, the processing including: detecting a connection state of a processing device for executing a predetermined process among the request items included in the print instructions: and selecting a print instruction of a description format corresponding to the connected processing device, and outputting the print instruction to the processing device.

A seventh aspect of the invention is to provide a computer readable storage medium storing a print management program executable by a computer to perform a processing of managing print processings for a printed matter in a print system which processes a print job on the basis of a first print instruction in which request items in print processes for obtaining a printed matter are described in a first description format or a second print instruction in which request items are described in a second description format different from the first description format, the processing including: detecting a connection state of a first processing device which interprets the first print instruction to execute a predetermined process among the request items included in the first print instruction and a second processing device which interprets the second print instruction to execute a predetermined process among the request items included in the second print instruction; and outputting the first print instruction to the first processing device when the first processing device is connected, and requesting the second print instruction from an output device which outputs the first print instruction and outputs the second print instruction corresponding to the first print instruction in response to a request and outputting the second print instruction received from the output device to the second processing device when the second processing device is connected.

An eighth aspect of the invention is to provide a computer readable storage medium storing a print management program executable by a computer to perform a processing of managing print processings for a printed matter in a print system which processes a print job on the basis of a first print instruction in which request items in print processes for obtaining a printed matter are described in a first description format or a second print instruction in which request items are described in a second description format different from the first description format, the processing including: detecting a connection state of a first processing device which interprets the first print instruction to execute a predetermined process among the request items included in the first print instruction and a second processing device which interprets the second print instruction to execute a predetermined process among the request items included in the second print instruction; and outputting the first print instruction to the first processing device when the first processing device is connected, and converting the first print instruction into the second print instruction and outputting the second print instruction to the second processing device when the second processing device is connected.

A ninth aspect of the invention is to provide a print system which processes a print job on the basis of a print instruction in which request items in print processes for obtaining a printed matter are described in a predetermined description format, the system including: a processing device that interprets the print instruction to execute a predetermined process among the request items included in the print instruction; a detection unit that detects a connection state of the processing device; and a selection unit that selects a print instruction of a description format corresponding to the connected processing device to output the print instruction to the processing device.

A tenth aspect of the invention is to provide a print management system which processes a print job on the basis of a first print instruction in which request items in print processes for obtaining a printed matter are described in a first description format or a second print instruction in which request items are described in a second description format different from the first description format, the system including: a processing device that interprets the first print instruction or the second print instruction to execute a predetermined process among the request items included in the print instruction;

a detection unit that detects a connection state of a first processing device which interprets the first print instruction to execute a predetermined process among the request items included in the first print instruction and a second processing device which interprets the second print instruction to execute a predetermined process among the request items included in the second print instruction; and a selection unit that outputs the first print instruction to the first processing device when the first processing device is connected, and requests the second print instruction from an output device which outputs the first print instruction and outputs the second print instruction corresponding to the first print instruction in response to a request and outputs the second print instruction received from the output device to the second processing device when the second processing device is connected.

BRIEF DESCRIPTION OF THE DRAWINGS

Embodiment of the present invention will be described in detail based on the following figures, wherein:

FIGS. 4A through 4D are image diagrams showing a configuration of a print instruction and a flow of data addition, in which FIG. 4A shows only basic fields, FIG. 4B shows fields including specifications required by a user, FIG. 4C shows fields including specifications for each print-related process, and FIG. 4D shows fields including detailed specifications for each print-related processes;

FIG. 8 is a flow chart showing a flow of an example of processings for merging of work flows of printing and electrophotographing.

DETAILED DESCRIPTION OF THE INVENTION

An embodiment for performing the present invention will be described below with reference to the accompanying drawings.

[System Configuration]

Figure 1:
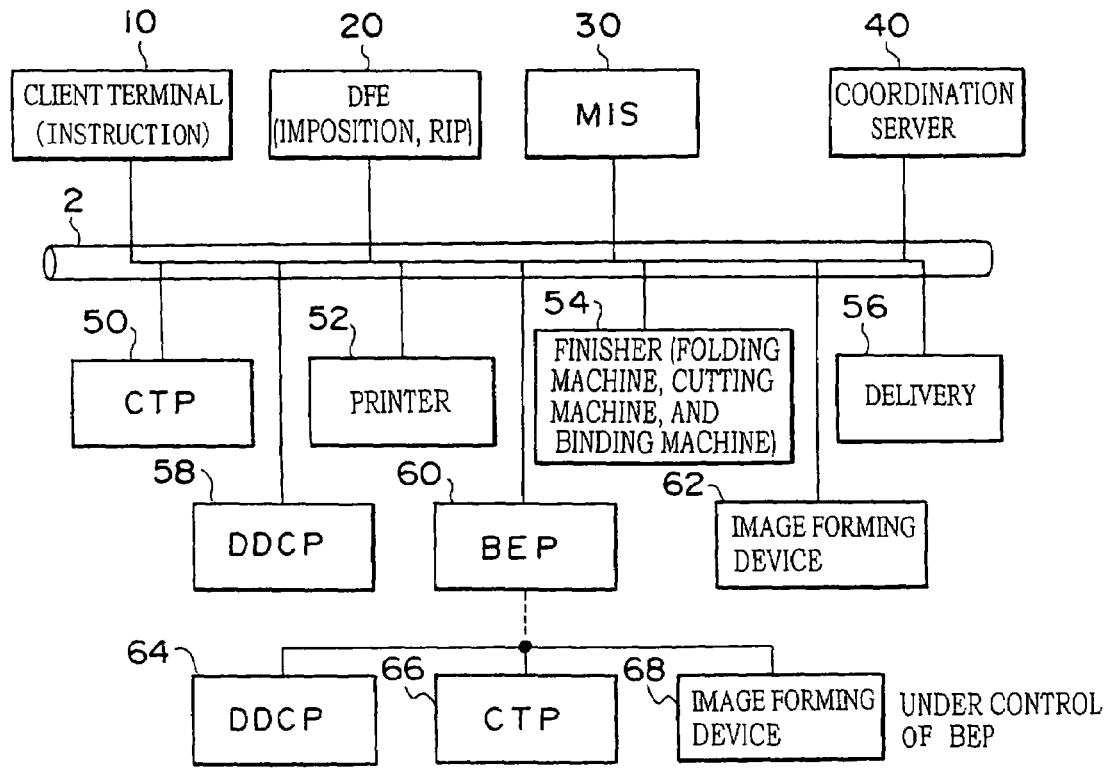
FIG. 1 is a block diagram showing the configuration of a print processing system according to an embodiment of the present invention.

FIG. 1 is a block diagram showing the configuration of a print processing system 1 according to an embodiment of the invention.

The print processing system 1 is obtained by connecting devices for realizing various services related to print processings through a network 2. In this case, the services mean functions which are related to printing and can be utilized in response to an external request. The services correspond to, for example, formation of layout data, imposition, data conversion, formation of a printing plate, printing, folding, cutting, and binding processes. However, the services are not limited to these processes.

More specifically, the print processing system 1 includes a client terminal 10 having a user interface which instructs print processings for ultimately obtaining a printed matter desired by a user by plural services, a DFE (Digital Front End Processor) device 20, a MIS (Management Information System) device 30, a coordination server 40, a CTP (Computer To Plate) device 50, a printer 52, a finisher device 54, and a delivery management device 56.

The DFE device 20 is a device which provides print data to an image forming device such as a CTP or a printer and makes print instruction. The MIS device 30 is a device which controls a device assigned to execute processing of services according to a print instruction (first print instruction). In a first print instruction, information related to a service procedure instructed by the client terminal 10 is described in a predetermined description format (for example, JDF: Job Definition Format). The coordination server 40 is a device which controls nodes such as a device assigned to execute processing of a service according to a print instruction (second print instruction) and a storage medium in which a program is stored. In the second print instruction, information related to service coordination instructed by the client terminal 10 is described by another description format. The print instructions described in these description formats can be expressed by a predetermined language (for example, XML: Extensible Markup Language). Namely, the predetermined description format or the other description format are expressed by XML, so that print instructions can be formed. The language is not limited to XML.

The CTP device 50 is a device which directly forms a printing plate on the basis of print data without producing intermediate products. The printer 52 is a device which performs printing by using the printing plate formed on the basis of the print data. The finisher device 54 is a device which obtains a printed matter desired by a user (for example, a printing matter resulting from book binding) and formed by folding, cutting, and binding sheets of printed paper. The delivery management device 56 is a device which manages a process of delivering a printed matter to the user.

The MIS device 30 is a device which controls a device assigned to execute processing of services according to a print instruction described in a predetermined description format (for example, JDF). In this embodiment, the MIS device 30 also has a management function which manages all of the processes of print processing system 1. For this reason, the MIS device 30 has a function which can form a print instruction described in a specification (for example, another description format) other than the predetermined description format such as JDF.

Further, a DDCP (Digital Direct Color Proofing) device 58, a BEP (Back End Processor) device 60, and an image forming device 62 are connected to the network 2. The image forming device 62 is a device such as a color copying machine, a facsimile, a printer or the like having a so-called printing function which forms an image on a recording medium by an electrophotography. The image forming device 62 can have a device configuration including the function of the finisher device 54. The DDCP device 58 may be an output device which directly performs print output for color proofing from DTP data or an output device which outputs a large-size print imposed for plate making. The BEP device 60 is a device including a function which performs various processings for data obtained by converting print data obtained by instruction of a client to raster data (RIP processing). The BEP device 60 can be connected to output devices such as a DDCP device 64 similar to the DDCP device 58, a CTP device 66 similar to the CTP device 50, and an image forming device 68 similar to the image forming device 62. More specifically, under the management of the BEP device 60, at least one of the DDCP device 64, the CTP device 66, and the image forming device 68 can be connected.

The coordination server 40 can be realized to be include a service retrieving server which retrieves a service desired by a user, an instruction generating server which forms a print instruction from information related to service coordination instructed by the client terminal 10, an instruction management server which manages a print instruction, and a coordination processing server which executes a coordination processing for services according to the print instruction. In addition, the coordination server 40 can also include an image processing device which performs image processing such as a noise reduction process, an image rotating process, an OCR (Optical Character Recognition) process, and an image binding process for an image document, a document management server which manages a document, a document delivery server which delivers a document, and a service processing device which performs predetermined service processing.

Service coordination means that the services have relationships such that a result of an arbitrary service determines a service to be subsequently activated or affects the operation of a subsequent service. The services as referred to herein mean a function related to print processings which can be utilized in response to an external request. The services correspond to, for example, copying, printing, scanning, facsimile transmission/reception, mail delivery, storage in a repository, reading from a repository, an OCR processing, a noise reduction processing, and the like. However, the services are not limited to these processes. Therefore, the coordination server 40 coordinates plural services to instruct and manage print processings desired by a user. The coordination server 40 executes a coordination processing for the services according to a print instruction on the basis of information related to service coordination in the print instruction.

The print processing system 1 has a configuration in which plural devices which perform predetermined print-related processings are connected through the network 2 in this embodiment. However, the print processing system 1 is not limited to this configuration as long as plural services are connected through the network 2.

A series of processes related to printing is decomposed into plural functional processes, and in such case, the print instruction refers to data including information representing the relationships between the processes and parameter information used in the processings executed in each process. The print instruction is described in a predetermined description format (for example, JDF or the like) (see FIGS. 4A through 4D).

Figure 2:
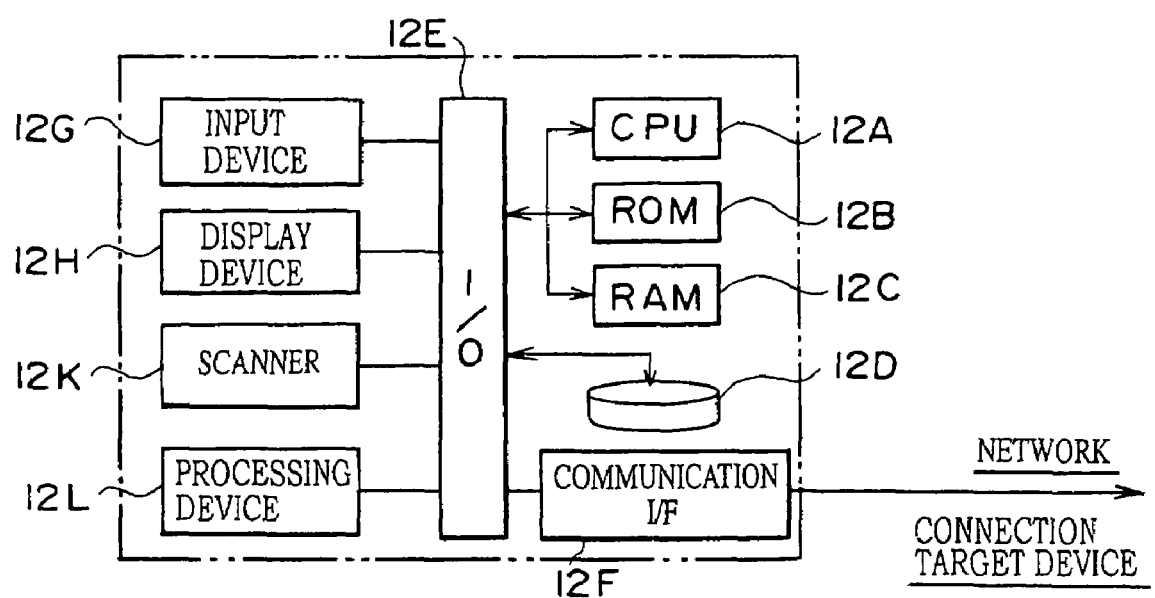
FIG. 2 is a block diagram showing the basic configurations of devices constituting the print processing system according to the embodiment of the invention.

FIG. 2 comprehensively shows the client terminal 10 as an example of a basic configuration of a device constituting the print processing system 1. The client terminal 10 includes at least a CPU 12A, and the CPU 12A is connected to an input/output bus 12E (I/O in FIG. 2). A ROM 12B and a RAM 12C are elements related to the CPU 12A. An input device 12G such as a keyboard or a mouse, a display device 12H such as a display, and a scanner device 12K for reading an image can be connected to the input/output bus 12E. A processing device 12L such as a printer or a proofer for carrying out functions to be processed by itself and a communication interface 12F to be connected to the network 2 or a connection target device (local host) can be connected to the input/output bus 12E.

Hardware resources having these configurations and software resources which are processing programs stored in the ROM 12B and the RAM 12C activate the devices constituting the print processing system 1. The devices constituting the print processing system 1 have an agent function unit for interpreting a print instruction by using the hardware resources and the software resources (see FIG. 3). The agent function unit interprets the XML description format (for example, JDF or the like) described in the print instruction and performs a conversion processing between the description format (for example, JDF or the like) and a dedicated language used to activate the mechanism units and the processing units of the devices constituting the print processing system 1.

Figure 3:
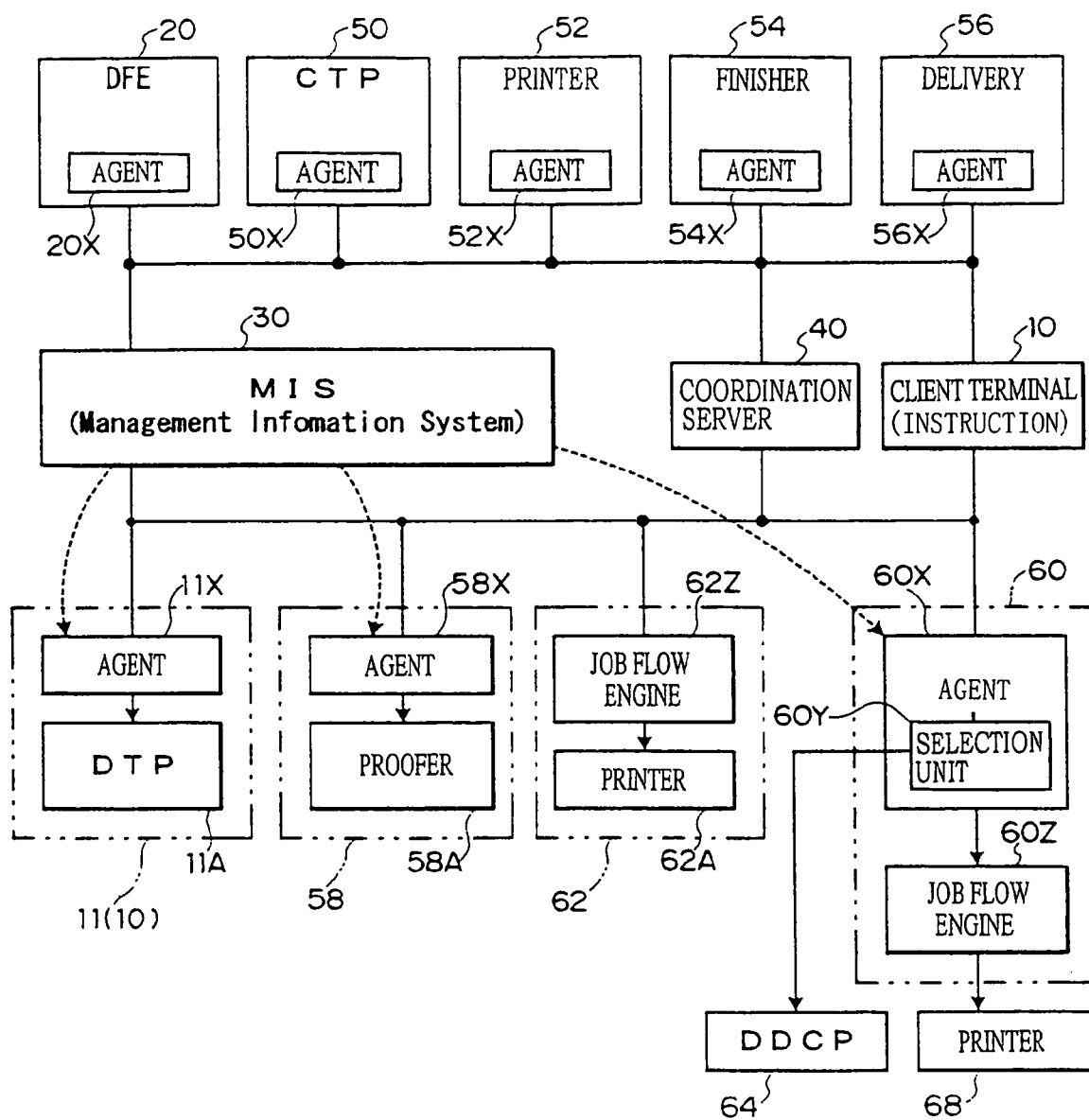
FIG. 3 is a block diagram for explaining cross relationships between the devices constituting the print processing system.

FIG. 3 is a block diagram for explaining cross relationships between the devices constituting the print processing system 1. The respective devices store interface information representing the contents of services provided by the devices, and has an agent function unit which interprets description contents described in the print instruction. In the following description, unless otherwise stated, it is assumed that the agent function unit has a configuration which can interpret the description contents described in the print instruction described in a first description format (for example, JDF).

More specifically, in the devices shown in FIG. 3, the agent function unit is explicitly shown by using the devices shown in FIG. 1 as bases. The client terminal 10 can selectively use any one of print instructions described in the first description format (for example, JDF) and a second description format (for example, a XML description format other than JDF). A DTP device 11 can perform processes based on a print instruction described in the first description format (for example, JDF) and has an input editing function to form developing paper, a process film, or the like by print data obtained by processing a page layout in a computer. For this reason, the DTP device 11 is constituted by an agent function unit 11X and a DTP function unit 11A. The DTP device 11 may function to perform only a processing of receiving the print data of the page layout formed by the client terminal 10 and forming developing paper, a process film, or the like.

Of the devices in FIG. 3, the DFE device 20, the CTP device 50, the printer 52, the finisher device 54, the delivery management device 56, and the DDCP device 58 can perform processing based on the print instruction described in the first description format (JDF). In addition, the MIS device 30 integrally manages print instructions described in JDF. On the other hand, the coordination server 40 integrally manages a print instruction described in the second description format (for example, XML expression obtained by a description format other than JDF).

In FIG. 3, the image forming device 62 and the image forming device 68 are different from each other in configuration. More specifically, the image forming device 62 has a configuration directly connected to the network 2, and the image forming device 68 is under the controlled of the BEP device 60. In the embodiment, the image forming device 62 is for realizing processing by a print instruction described in the second description format (for example, XML expression obtained by a description format other than JDF). For this reason, the image forming device 62 is constituted by a job flow engine 62Z for interpreting a print instruction described in the second description format and a printer device 62A. Namely, the job flow engine 62Z interprets the print instruction described in the second description format and converts the print instruction into data described in a unique language of the printer device 62A adjusted and outputs the data to the printer device 62A.

The BEP device 60 has a configuration which can perform both processing by the print instruction described in the first description format (for example, JDF) and processing by the print instruction described in the second description format (for example, XML expression described by a description format other than JDF). For this reason, the BEP device 60 includes an agent function unit 60X for interpreting both of the description formats. Further, the BEP device 60 can have a function of converting both of the description formats between each other. The agent function unit 60X includes a selection unit 60Y for selecting, as a connection targets, an output targets for a device which can execute processing by the print instruction described in the first description format and a device which can execute processing by the print instruction described in the second description format. A DDCP device 64 is connected to the selection unit 60Y, and the image forming device 68 is connected to the selection unit 60Y through a job flow engine 60Z for interpreting the print instruction described in the second description format.

FIGS. 4A through 4D are diagrams showing the configurations of print instructions and a flow of addition of data to the print instruction. As shown in FIG. 4A, the print instruction is constituted by basic fields of <printed matter specification>, <plate-making process>, <print process>, <folding process>, <cutting process>, <binding process>, and <delivery process>. The print instruction is described in a predetermined description format (for example, XML expression by JDF or a description format other than JDF).

<Printed matter specification> shows items of the specification of a printed matter itself serving as an output result of the print processing system 1. In <printed matter specification>, predefined items are used. Inputting and setting of these items are mainly performed in sales and marketing departments which recognize demands of users such as a customer who requests a printed matter. For example, configuration, paper quality, a size, the number of copies, and the like correspond to the items. <Plate-making process> includes items for stipulating a plate-making for printing. Inputting and setting of these items are mainly performed in a process management department or the like which manages plate-making formation processes. For example, a device to be used for a plate-making, a process due date, and the like correspond to the items. <Print process> includes items for substantially stipulating processes for printing. Inputting and setting of these items are mainly performed in a process management department for managing print processes. For example, a device to be used for printing, inks to be used, and the like correspond to the items.

<Folding process> includes items for stipulating a folding process for an output printed matter. Inputting and setting of these items are mainly performed in a process management department or the like which manages a folding process. For example, a device to be used for folding, a process due date, and the like correspond to the items. <Cutting process> includes items for stipulating a cutting process for a printed output or an output obtained after the folding process. Inputting and setting of these items are mainly performed in a process management department for managing the cutting process. For example, a device to be used for cutting, a process due date, and the like correspond to the items. <Binding process> includes items for stipulating a binding process for one of a printed output, an output obtained after the folding process, and an output obtained after the cutting process. Inputting and setting of these items are mainly performed in a process management department which manages the binding process. For example, a device to be used for binding, a process due date, and the like correspond to the items.

In a print instruction 70 in which a concrete configuration is not described as shown in FIG. 4A, a request from a requester of a printed matter is received, whereby <printed matter specification> and <delivery process> are determined.

Then the determinate items are described in the print instruction 70 as shown in FIG. 4B. This processing is mainly performed by an input operation of the client terminal 10. In this case, since concrete items of the print processes performed according to the print instruction 70 are not determined, the print instruction 70 is distributed to the respective processes. As shown in FIG. 4C, data in the fields <plate-making process>, <print process>, <folding process>, <cutting process>, and <binding process>, are determined by the respective processes and the determined items are described in the print instruction 70. This processing is performed by devices for the respective processes, and is not basically affected by the other devices (processes). More specifically, the items determined for the processes shown in FIG. 4C may be data corresponding to specification items processed in the corresponding processes, and detailed data regarding the content of the processes are not necessary. However, when processings are actually performed in the processes, detailed specifications must be determined. Thus, as shown in FIG. 4D, in the processes, detailed specification items used in processings in the processes are determined and performed.

(Print Coordination Processing)

A user executes a coordination processing for obtaining a printed matter by reading out a print instruction. More specifically, the coordination processing is executed as follows.

In the present embodiment, different assigned control devices are applied to print instructions of different description formats. As an example, the following case will be described. That is, the MIS device 30 is assigned to handle a print instruction of a description format according to JDF (to be referred to as JDF hereinafter) as the first description format, and the coordination server 40 is assigned to handle a print instruction of an XML description format other than JDF (to be referred to as another description format hereinafter) as the second description format. However, the MIS device 30 has a management function which manages the whole of the print processing system 1 and also has a function which can form a print instruction described in a description format other than JDF or the like (for example, another format which is an XML description format other than JDF).

The client terminal 10 has a function of a graphical user interface (GUI) to perform screen display or a predetermined operation to instruct preparation of a print instruction or select a print instruction to be activated.

Figure 5:
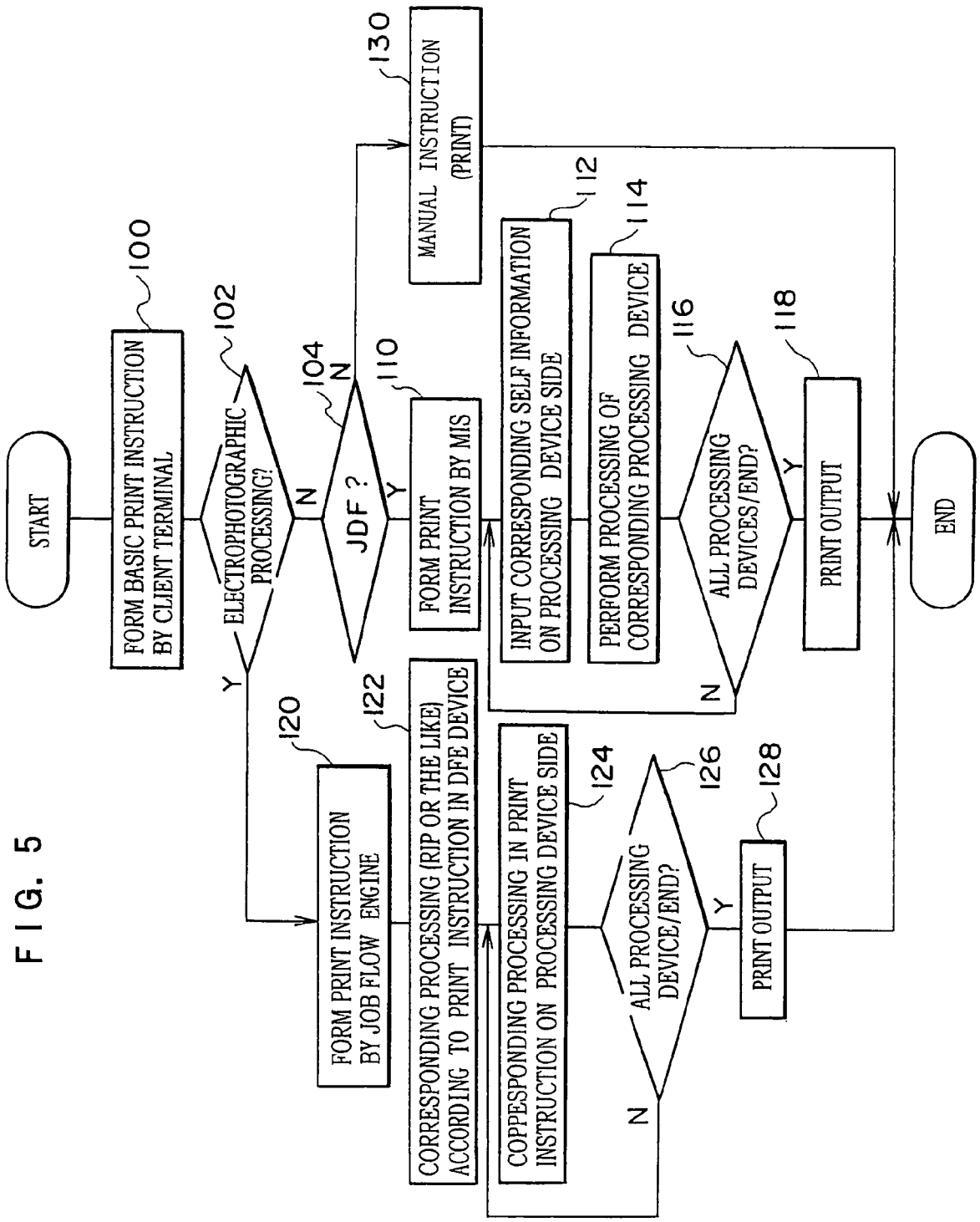
FIG. 5 is a process flow chart related to coordination processings including the flow from request of a printed matter to acquisition of the printed matter.

FIG. 5 shows a process flow chart related to the coordination processing of the flow from a requesting of a printed matter to obtaining the printed matter.

The client terminal 10 stores a print instruction (see FIG. 4A) constituted by blank fields in advance, and reads the stored basic print instruction (step 100). In the client terminal 10, the read basic print instruction 70 is displayed, and initial necessary items are described in the basic print instruction due to an inputting operation by a user, so that the basic print instruction 70 expressing a request for a printed matter is formed and output to the outside.

In this case, as the description format of the print instruction 70, any one of a print instruction described in another description format, a print instruction described in JDF, and a print instruction for manual instruction is selectively instructed. At this time, in order to omit selection of the print instructions by a user who operates the client terminal 10, any one of the print instructions may be set as a default value.

The print instructions are not limited to being stored in the client terminal 10. For example, the print instructions may be stored in the MIS device 30 in advance and read from the MIS device 30. In addition, an accumulation server which accumulates print instructions can be connected to the network 2, and the print instructions may be read from the accumulation server. In addition, the accumulation server function can be given to another device connected to the network 2 to enable the device to output a print instruction in response to a request. Furthermore, plural print instructions may be given to other devices connected to the network 2 such that the print instructions are dispersed or shared, so that a user can retrieve a desired print service related to printing from plural devices connected to the network 2.

As the print instruction 70, any one of a print instruction described in another description format, and the print instruction described in JDF, the print instruction for manual instruction is selectively instructed. Thus, a process performed until a printed matter corresponding to a request is obtained is different in each process. Namely, the print instructions of the three types are discriminated from each other (steps 102 and 104). When the print instruction described in another description format is selected (the determination is affirmative in step 102), a print instruction is prepared in the coordination server 40 (step 120). When the print instruction in JDF is selected (the determination is negative in step 102 and the determination is affirmative in step 104), a print instruction is prepared in the MIS device 30 (step 110). In addition, when the print instruction for manual instruction is selected (the determination is negative in steps 102 and 104), the print instruction is printed (step 130).

In the print processing system 1 according to the embodiment, a processing device for processing a print service executes the following processes corresponding to each format of a print instruction.

Print Instruction of JDF

Processes corresponding to the print instruction of JDF will be described below. When the basic print instruction is a print instruction described in JDF, a print instruction is prepared in the MIS device 30 (step 110).

In the print instruction described in JDF, not all pieces of information related to control of coordination processing of services related to printing are not described, and basic fields serving as processes related to printing (to be referred to as a print-related process hereinafter) are described, and items in the fields are sequentially filled by devices which perform each service. In order to realize the coordination processing, the MIS device 30 can generate a print instruction (see FIG. 4A) serving as a base for coordinating the print-related processes (services executed in the print-related processes). More specifically, the MIS device 30 acquires or retrieves location information expressing a position of a device which is assigned to or manages the print-related processes (services) on the network 2, so that the processing devices which process the print-related processes dispersed on the network 2 are recognized and managed. The MIS device 30 generates an HTML file serving as a GUI screen for reflecting a request from a user with respect to the basic print instruction, and transmits the basic print instruction to the client terminal 10 in response to a request.

The client terminal 10 transmits the HTML file including the items in the fields defined by an operation of a user to the MIS device 30. The MIS device 30 receives the HTML file and prepares a print instruction in which the request from the user is reflected (see FIG. 4B). The print instruction is constituted by a file described in JDF.

The MIS device 30 can manage devices which interpret, execute, and associate the print instructions. The MIS device 30 interprets the basic print instruction received from the client terminal 10, outputs a instruction to the processing devices according to the print-related processes described in the print instructions, and executes the print coordination processing. The MIS device 30 stores information of a status of an active coordination processing and information of the finished coordination processing, and can carry out notification of the status and result of the coordination processing in response to an external request.

When the MIS device 30 interprets the print instructions and makes a request to the processing devices assigned to the print-related processes, the MIS device 30 need not generate individual instruction information including processing request contents, an input parameter, and information for specifying a document to be processed. The request is processed in the print-related processes or the like. More specifically, the request from the MIS device 30 to the processing devices carries out notification only that the print-related processes are requested unless there is a special instruction made by a user. In addition, the processing devices assigned to the print-related processes carries out notification of information related to specifications until a printed matter is obtained, such as the available devices and a due date required in response to requests to the MIS device 30. On the basis of the information, the MIS device 30 can fill the fields of the print instruction 70.

Concrete processes will be described below.

Each processing device assigned to the print-related processes carry out notification of interface information including information representing the outline of the print-related processes and addresses to the MIS device 30. The processing devices assigned to the print-related processes set various specifications for managing the details of each print-related process. The MIS device 30 stores interface information transmitted from the processing devices assigned to the print-related processes.

According to an operation of a user, the client terminal 10 accesses a URL (Uniform Resource Locator) of an HTML file generated for a user interface screen arranged in the client terminal 10 or provided by another server through an installed browser. In response to a browsing request, the HTML file (basic print instruction) of the user interface screen is transmitted from the access destination to the client terminal 10, and the screen is displayed on the client terminal 10. At this time, a user can specifications for obtaining a desired printed matter by using the user interface screen displayed on the client terminal 10. More specifically, the user inputs items such as the specifications of the desired printed matter.

When the specifications of the printed matter are defined through the interface screen, the client terminal 10 transmits a print instruction including the specifications of the printed matter defined by the user (HTML file including the items in the fields defined by an operation of the user) to the MIS device 30.

The MIS device 30 forms the print instruction which defines the information for specifying the print-related processes on the basis of the print instruction (HTML file) including the specifications of the printed matter transmitted from the client terminal 10 and the interface information acquired from the processing devices (step 110). In this manner, the MIS device 30 obtains a print instruction described in JDF.

The MIS device 30 starts execution of the coordination processing depending on the print instruction obtained by the instruction of the client terminal 10 (steps 112 to 118). The MIS device 30 interprets the print instruction from the client terminal 10, and notifies a processing device assigned to execute one described print-related process that the print-related processes are instructed and requested. In response to the notification, in the processing devices assigned to the print-related processes, the information related to the specifications required until the printed matter is obtained such as available devices in the processes and a due date is input, and notified to the MIS device 30 (step 112). At that time, in the processing devices, concrete individual instruction information including information of processing request contents, an input parameter, and information for specifying a document to be processed or the like is generated. The processing devices execute the processing of the requested print-related processes (step 114). The MIS device 30 repeats the above processes until all of the instruction of the print-related processes described in the print instruction have ended (step 116). The print-related processes mentioned here correspond to processings conducted by the DFE device 20, the CTP device 50, the printer 52, the finisher device 54, the delivery management device 56, the DDCP device 58, and the like.

When all of the processings have ended (the determination is affirmative in step 116), the completion of the processings according to the print instruction is recognized, and corresponding post-processings are executed (step 118). The post-processings correspond to processing for making the printed matter formed by the printer 52 a final printed matter by the finisher device 54 or a processing for managing delivery by the delivery management device 56.

Processing for only inquiry and reply of only completion of the print instruction can be performed (steps 112 to 116), and according to the print instruction generated as a result, a post-processing for a print output can be performed (step 118).

Figure 6:
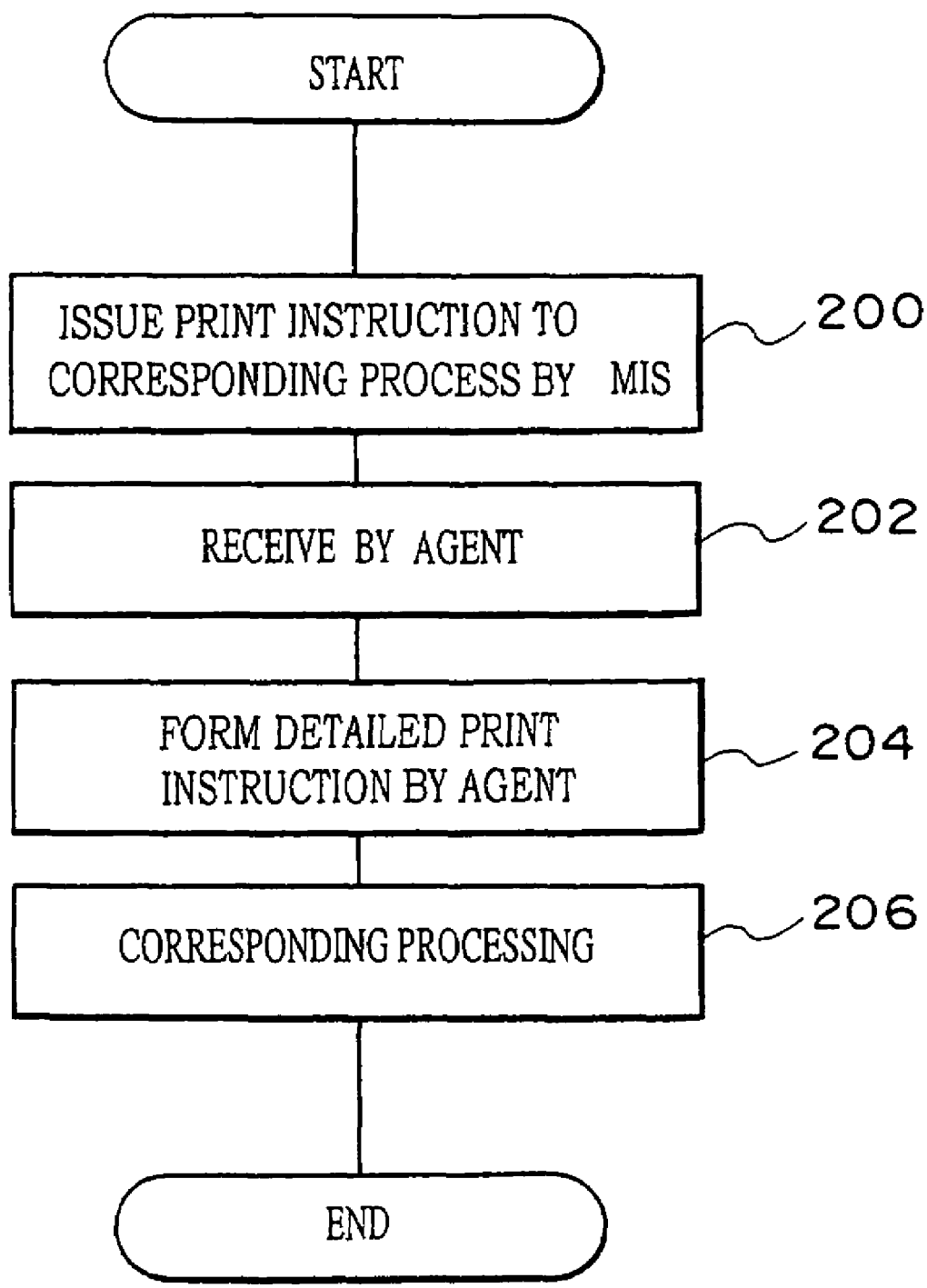
FIG. 6 is a process flow chart related to processing performed by a processing device which is assigned to one print-related process.
Figure 7:
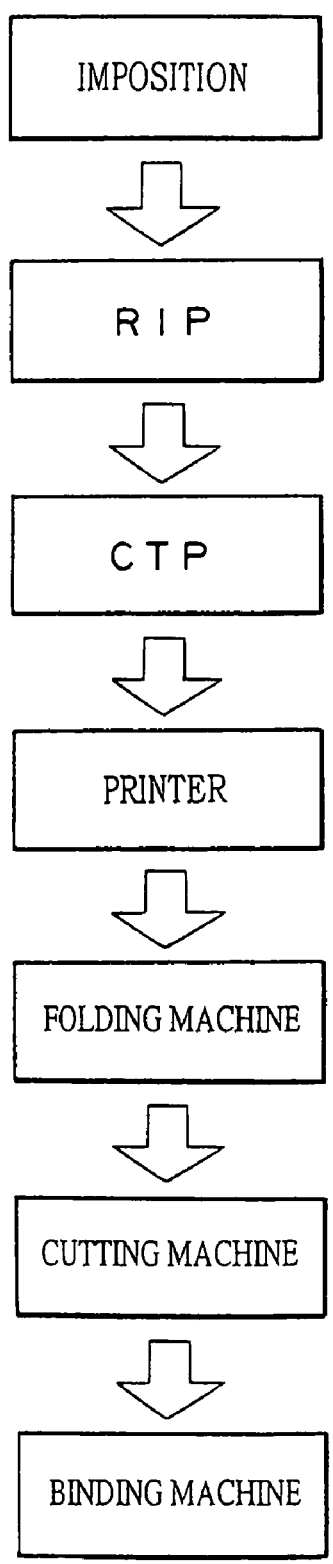
FIG. 7 is a diagram showing a flow of conventional print processes.

Processings performed by a processing device assigned to one print-related process described in a print instruction from the client terminal 10 interpreted by the MIS device 30, i.e., processings performed in steps 112 and 114 by the processing devices will be described below. FIG. 6 shows a process flow chart related to processings performed by a processing device assigned to one print-related process. In the following description, <print process> is used as an example of the print-related process, and the printer 52 is used as an example of the processing device assigned to the print-related process.

The MIS device 30 interprets the print instruction and requests the <print process> described in the print instruction to execute a corresponding service (print processing) (step 200). In this case, a print instruction described in JDF is issued to the printer 52, and the print instruction is received by an agent 52X of the printer 52 (step 202). The agent 52X interprets the received print instruction described in JDF and extracts the part corresponding to the assigned process. The agent 52X displays instruction or the like from the MIS device 30 on a user interface screen to urge a user who manages <print process> to input information related to the specifications required until a printed matter is obtained such as available devices in <print process> and a due date. In this manner, the user who manages <print process> inputs items of requested specifications of <print process>. The inputted items are notified to the MIS device 30. The state in which the items of specifications of <print process> are inputted is shown in FIG. 4C.

At the same time, in the agent 52X, the independent pieces of concrete individual instruction information including the processing request contents, the input parameter, and information for specifying the document to be processes are generated (step 204). Thus, the <print process> can be executed. An individual print instruction in which the items (in FIG. 4C, items of device setting and ink setting) of the concrete individual instruction information in the <print process> is shown in FIG. 4D. As a corresponding processing in <print process>, printing is performed such that the printer is operated by the individual print instruction shown in FIG. 4D (step 206).

Print Instruction in Another Description Format

Processes corresponding to a print instruction described in another description format will be described below. With respect to a coordination processing performed by the print instruction described in another description format, a technique for which application for a patent has been made by the present applicant exists (Japanese Patent Application No. 2002-275230 or the like). When a basic print instruction is described in another XML description format, a print instruction is formed in the coordination server 40 (step 120).

In the print instruction described in another description format, all information regarding control of a coordination processing for service related to printing are described. In order to realize the coordination processing, the coordination server 40 retrieves the services related to the print processing, and can generate a print instruction for coordinating these services. More specifically, the coordination server 40 acquires location information representing a position of nodes for executing the services related to the print processing on the network 2 in advance, acquires interface information representing an input/output relationship of the processing devices and application programs from the processing devices for executing the services related to the print processings dispersed on the network 2 on the basis of the location information, and manages the interface information. On the basis of the acquired interface information, the coordination server 40 generates an HTML file serving as a GUI screen for defining a job flow (manner of coordination between the services) and transmits it to the client terminal 10 according to the request from the client terminal 10.

The client terminal 10 transmits the job flow information defined by an operation of a user to the coordination server 40 in CGI form. The coordination server 40 forms a print instruction which defines information of contents of processings requested from the services, the input parameter, the manner of coordination of the services (job flow), information for specifying a document to be processed such as a document name and storage location information, on the basis of job flow information related to instruction of service coordination from the user and interface information of each of the service. The print instruction is constituted by files described in another description format.

The coordination server 40 can interpret and execute the print instruction. The coordination server 40 interprets the print instruction received from the client terminal 10, sequentially calls service processing devices of the processing devices (image forming device 62 and the like in the embodiment) according to an order and a utilization method described in the print instruction, and executes the coordination processings. The coordination server 40 can store information of the status of activated coordination processing or the result of a finished coordination processing and carry out notification of the status and results of the coordination processings in response to an external request.

When the coordination server 40 interprets the print instruction to make requests to the service processing devices, the coordination server 40 generates individual instruction information including the processing request contents, the input parameters, and information for specifying the document to be processed. The coordination server 40 may describe relationships between processings performed before and after the processings performed by the service processing devices in the print instruction or may make a processing request in information exchange formats particular to processing devices or application programs which execute the services instead of the format of the print instruction.

The image forming device 62 which is an example of a device which performs a print service performs a document processing, i.e., printing, on the basis of the information of the service processing request contents, the input parameter, and the information of the document to be processed, included in the processing request from the coordination server 40. The image forming device 62 notifies the coordination server 40 of its own interface information when it is activated. The interface information is used when a print instruction is prepared.

Concrete processes will be described below.

A service processing device such as the image forming device 62 notifies the coordination server 40 of interface information including the outlines of services and addresses in an activation processing. The coordination server 40 stores interface information transmitted from each of the service processing devices such as the image forming device 62.

The client terminal 10 accesses a URL of an HTML file generated for a user interface screen arranged in the client terminal 10 or provided by another server through an installed browser according to an operation of a user. In response to a browsing request, the HTML file of a user interface screen is transmitted from the access destination to the client terminal 10, and the screen is displayed on the client terminal 10. At this time, the user can define a flow of desired print processing coordination (to be referred to as a print coordination flow hereinafter) by using the user interface screen displayed on the client terminal 10.

When the print coordination flow is defined through the user interface screen, the client terminal 10 transmits print coordination flow information related to print coordination defined by the user to the coordination server 40.

The coordination server 40 prepares a print instruction which defines information of the contents of processings requested from the services, an input parameter, a manner of coordination of the services, information for specifying a document to be processed such as a document name or storage location information on the basis of print coordination flow information transmitted by the client terminal 10 and interface information obtained from each processing device (step 120). The coordination server 40 obtains a print instruction described in another description format.

The coordination server 40 then starts execution of the coordination processing depending on the print instruction obtained by the instruction of the client terminal 10 (steps 122 to 128).

The coordination server 40 interprets the print instruction and requests the first processing described in the print instruction to execute a corresponding service processing (step 122). In this case, a RIP processing which generates a raster image for printing corresponds to the processing. The coordination server 40 forms individual instruction information for the DFE device 20 and transmits the information to the DFE device 20. In the DFE device 20, the RIP processing which generates a raster image is executed. When the processing is completed, the DFE device 20 transmits processing results such as status information of the processing (completion), an output parameter, storage location information of the document obtained by the processing (location information of the DFE device 20 or another device) and the like to the coordination server 40.

The coordination server 40 then interprets the print instruction and requests the next processing described in the print instruction to execute a corresponding service processing (step 124). In this case, the print processing which forms a print in the image forming device 62 corresponds to the processing. The coordination server 40 forms individual instruction information for the image forming device 62 and transmits the information to the image forming device 62. The image forming device 62 executes a print processing. When the processing is completed, the image forming device 62 transmits processing results such as status information of the processing (completion), an output parameter, storage location information of the document obtained by the processing (location information of the image forming device 62 or another device) and the like to the coordination server 40.

The coordination server 40 then interprets the print instruction to decide whether a next processing is described in the print instruction. When an unprocessed service is described in the print instruction (the determination is negative in step 126), the processings are repeated. On the other hand, when all of the processings are completed (the determination is affirmative in step 126), the completion of the processings described in the print instruction is recognized, and corresponding post-processings are executed (step 128). In this case, the post-processings correspond to those such as delivery of prints formed in the image forming device 62 or classification of prints.

The coordination server 40 can manage the processing results and the processing request results of the image forming device 62 or the like as a log.

Print Instruction in Manual Instruction Format

Processes corresponding to a print instruction in a manual instruction format will be described below. In this case, the print instruction is described in a description format which does not depend on the formats described above, and a user performs print-related processings by an individual notification or a notification made by another communication mode. Namely, the print instruction of the manual instruction format is prepared by the client terminal 10 (step 130).

All information related to control of a coordination processing of services related to printing must be described in the print instruction in the manual instruction format. For this reason, in the client terminal 10, in order to describe all information related to the control of the coordination processing of the services related to printing, a template in which all of the information can be described is prepared, information is entered (input) into this template to prepared the data of the print instruction, and the print instruction is printed. On the basis of the resultant printout, the user performs manual instruction to realize the coordination processing of the services related to printing with a manual operation.

(Merging of Work Flows for Printing and Electrophotography)

In the above description, the mode in which a print processing using a conventional printing plate or the like or a print processing by an electrophotographic scheme is executed on the basis of the first print instruction described in JDF or the second print instruction described in another description format is described with reference to the flow chart shown in FIG. 5.

Here a case will be described below in which, when a device connected to the BEP device 60 is caused to execute a processing included in a print process instructed by a first print instruction, and when a device which can execute the processing is not connected to the BEP device 60 (print management device), a device which can execute a processing almost identical to the above processing and can perform a processing based on the second print instruction is substituted for the device connected to the BEP device 60. As an example, a case in which printing for color proofing before printing is instructed by the first print instruction and the processing is alternatively performed by a device which can perform a processing based on the second print instruction will be described below with reference to the flow chart shown in FIG. 8. Control shown in FIG. 8 is executed when execution of color proofing is instructed in print-related processes defined in the first print instruction, and corresponds to the processings of step 112 and 114 in FIG. 5.

In this case, the MIS device 30 (output device) will be described below based on the assumption that the MIS device 30 has a function which generates not only the first print instruction but also the second print instruction and a function which converts the first print instruction into the second print instruction.

The MIS device 30 issues the first print instruction to the BEP device 60. Then, the agent 60X (detection unit) of the BEP device 60 receives and interprets the first print instruction issued from the MIS device 30 to recognize that execution of color proofing is instructed.

The agent 60X checks devices connected under the control of the BEP device 60 (step 300). More specifically, a command for inquiring as to a state of the device is transmitted to a connected device, and device information is received from the connected device, so that the BEP device 60 can check what kind of function is processed by a device connected under the control thereof. The device information includes, in addition to the information of the function processed by the device, information for specifying a device such as indicating whether the device can perform a processing based on the first print instruction or can perform a processing based on the second print instruction, i.e., whether the device can handle JDF or not.

The device connected under the control of the BEP device 60 may spontaneously transmit the device information to the BEP device 60 when the device is connected to the BEP device 60.

The agent 60X decides, on the basis of the acquired device information, whether a device which can execute printing for color proofing and which can handle JDF, i.e., the DDCP device 64 (first processing device), is connected (step 302).

When the DDCP device 64 is connected, the agent 60X describes parameters to be set for the DDCP device 64 in printing for color proofing in the first print instruction. The selection unit 60Y (selection unit) selects the DDCP device 64 as an output destination of the first print instruction and outputs the first print instruction to the DDCP device 64 (step 304). As the parameters described in the first print instruction, for example, various print conditions such as the angle, type, number of lines, and profile of the screen, and inks are included. The parameters used can be stored in an internal memory as predetermined parameters and read from the memory, or can be set by an operation of a user.

When the DDCP device 64 receives the first print instruction from the agent 60X, the coordination server 40 executes a print processing for color proofing according to the first print instruction (step 306). On the other hand, when the device which can handle JDF is not connected, the DDCP device 64 determines whether a device which cannot handle JDF and which can execute a processing almost identical to the print processing for color proofing performed by the DDCP device 64, i.e., a printer 68 (second processing device), is connected (step 308).

When the printer 68 is connected, the agent 60X notifies the MIS device 30 that the connected device cannot handle JDF (step 310).

In this manner, the MIS device 30 generates the second print instruction corresponding to the first print instruction, i.e., the second print instruction in which a instruction to perform a print processing for color proofing is described, and issues the second print instruction to the BEP device 60 (step 312). Accordingly, the agent 60X receives the second print instruction from the MIS device 30. The selection unit 60Y selects the job flow engine 60Z as an output destination of the second print instruction and outputs the second print instruction.

The job flow engine 60Z interprets the received second print instruction, describes parameters to be set for the printer 68 in the printing for color proofing in the second print instruction, and outputs the second print instruction to the printer 68 (step 314). As the parameters described in the second print instruction, for example, various print conditions such as a page sequence for instructing an order of pages to be printed and the type and the size of paper used in printing or the like are included. The parameters used can be stored in the internal memory as, e.g., predetermined parameters, and read from the memory, or can be set by an operation of a user.

When the printer 68 receives the second print instruction from the job flow engine 60Z, the printer 68 executes a print processing for color proofing according to the second print instruction (step 316).

When neither of the device which can handle JDF and a device which cannot handle JDF and can execute a processing almost identical to the print processing for color proofing performed by the DDCP device 64 is connected, it is determined that the printing for color proofing cannot be executed, and a predetermined error processing is performed (step 318). The error processing can include a processing in which the agent 60X notifies the MIS device 30 that the color proofing cannot be executed. Therefore, the MIS device 30 records as a log or notifies, e.g., the client terminal 10 or the like, that the color proofing cannot be executed, so that the MIS device 30 can notify a user that the color proofing cannot be executed.

As described above, in the embodiment, in execution of the print processing according to the first print instruction described in JDF, although printing for color proofing is instructed, when the DDCP device 64 serving as a device which can handle JDF is not connected to the BEP device 60 so that it is impossible to execute the printing for color proofing, the second print instruction corresponding to the first print instruction is generated. The second print instruction is output to the printer 68 serving as a device which cannot handle JDF to execute the print processing for color proofing. Thus, when the DDCP device 64 is not connected to the BEP device 60, the print processing for color proofing is alternatively performed by the printer 68 which is a printing device of an electrophotographic scheme, so that the printing process can be performed without being late for the due date. The MIS device 30 issues only the first print instruction in which an abstract instruction for executing color proofing is described to the BEP device 60, and a device is automatically selected by the BEP device 60 to perform the print processing. For this reason, a processing load on the MIS device 30 can be reduced.

The embodiment describes the case in which, when printing for color proofing cannot be performed by a device which can handle JDF, a processing almost identical to the print processing is performed by a device which does cannot handle JDF. However, the invention can be applied to not only printing for color proofing but also to any precessings which can be performed almost identically by a device for JDF and a device which cannot handle JDF. For example, when a binding process for a printed matter is defined by the first print instruction, and when a finisher which has a binding function and can handle JDF is not connected to the BEP device 60, a second print instruction corresponding to the first print instruction can be generated. The second print instruction can be output to the printer 68 which is connected to the BEP device 60, has a binding function, and cannot handle JDF, so that the binding function of the printer 68 can be alternatively used.

In the embodiment, when a processing cannot be performed by a device which can perform a processing based on the first print instruction, the second print instruction is acquired by requesting the second print instruction from the MIS device 30. However, on the BEP device 60 side, the first print instruction also may be converted into the second print instruction in the BEP device 60.

In the embodiment a case is described in which, when a processing cannot be performed by a device which can perform a processing based on the first print instruction, a processing almost identical to the above processing is performed by a device which can perform a processing based on the second print instruction. However, when a processing cannot be performed by a device which can perform a processing based on the second print instruction, a processing almost identical to the above processing may be performed by a device which can perform a processing based on the first print instruction.

The invention is not limited to preparation or conversion of different print instructions. More specifically, a processing device which can perform the same processing as that of a device for the first print instruction and which can interpret the first print instruction may be used as an alternative processing device.

When an alternative processing device is set, the processing device may be selected from plural devices which are identical to each other. However, the devices may be different types of machines which have identical functions, may have different manufacturers, or may be different in the description format that they can handle. In this case, the difference results in different processing time or processing accuracy (processing quality such as print quality). Therefore, an alternative processing device can be actively set. More specifically, in a case where processing devices are switched when the processing devices can be activated by detecting the connection state as described above, it is possible to recognize a connection state, preset processing time or processing accuracy, and substitute a processing device which matches an inputted state. Thus, when a user request is for very rapid printing, the fastest printing device in the print processing system 1 can be set to perform a print processing, so that a printed matter can be provided to match the request of the user.

As described above, the invention can realize a print management device which manages a print processing for a printed matter in a print system which processes a print job on the basis of a print instruction. The print instruction is provided as a first print instruction in which request items in print processes for obtaining a printed matter are described in a first description format or a second print instruction in which request items are described in a second description format different from the first description format. The print management device can be realized by including a detection unit and a selection unit. The detection unit detects a connection state of a first processing device which interprets the first print instruction to execute a predetermined process among the request items included in the first print instruction and a second processing device which interprets the second print instruction to execute a predetermined process among the request items included in the second print instruction. The selection unit outputs the first print instruction to the first processing device when the first processing device is connected, and requests the second print instruction from an output device which outputs the first print instruction and outputs the second print instruction corresponding to the first print instruction in response to a request, and outputs the second print instruction received from the output device to the second processing device when the second processing device is connected.

The output device can further include a conversion unit which converts the first print instruction into the second print instruction. More specifically, the conversion unit generates the second print instruction which can execute a processing which is almost identical to a processing based on the first print instruction.

The print management device may further include an error processing unit which performs a predetermined error processing when neither of the first processing device and the second processing device is connected.

The predetermined error processing may include a processing which notifies the output device that the processing cannot be executed.

What is claimed is:

1. A print management device for managing print processes for obtaining a printed matter in a print system which processes a print job on the basis of print instructions having request items in the print processes, the request items described in each of the print instructions being defined by a predetermined description format, the device comprising:
    a receiving unit that receives the print instructions of the predetermined description format;
    a detection unit that detects a connection state of a plurality of processing devices, each of the plurality of processing devices executing a single process that is one of the request items, at least one of the plurality of processing devices executing the single process uses a first description format different from that of a second description format used by another of the plurality of processing devices executing the single process;
    a selection unit that selects a print instruction of the description format corresponding to the connected processing device to output the print instruction to the processing device; and
    an output unit that if the connected processing device interprets the first description format, outputs to the connected processing device the received print instructions, and if the connected processing device interprets the second description format, converts the print instructions to other print instructions defined by the second description format and outputs to the connected processing device the converted print instructions, wherein
    the detection unit detects the connection state between the print management device and the plurality of processing devices,
    the selection unit determines the description format which the processing device connected to the print management device can interpret,
    the first description format is a Job Definition Format (JDF), and the second description format is other than the JDF, and
    the print instructions defined by the first description format and the second description format include information representing the relationship between the single process and another print process in the print job.

2. A print management device for managing print processes for obtaining a printed matter in a print system which processes a print job on the basis of first and second print instructions having request items in the print processes, the request items described in each of the first and second print instructions being defined by a predetermined description format, the device comprising:

a receiving unit that receives print instructions of the predetermined description format;

a detection unit that detects a connection state of first and second processing devices, the first processing device interpreting the first print instruction to execute a single process that is one of the request items, the second processing device interpreting the second print instruction to execute the same single process as the first processing device, the second print instruction being different in the description format from the first print instruction;

a selection unit that outputs the first print instruction to the first processing device when the first processing device is connected, and that requests output of the second print instruction from an output device, which outputs the first print instruction and outputs the second print instruction corresponding to the first print instruction in response to a request, and outputs the second print instruction received from the output device to the second processing device when the second processing device is connected; and an output unit that, if the connected processing device interprets a first description format, outputs to the connected processing device the received print instructions, and if the connected processing device interprets a second description format, converts the print instructions to other print instructions defined by the second description format and outputs to the connected processing device the converted print instructions, wherein the detection unit detects the connection state between the print management device and the plurality of processing devices, the selection unit determines the description format which the processing device connected to the print management device can interpret, the description format of the first print instruction is a Job Definition Format (JDF), and the description format of the second print instruction is other than the JDF, and the print instructions defined by the first description format and the second description format includes information representing the relationship between the single process and another print process in the print job.

3. The print management device according to claim 2, wherein the selection unit includes a notification unit which notifies the output device that the second processing device is connected, and requests the second print instruction with the notification.

4. The print management device according to claim 2, wherein the output device includes a conversion unit that converts the first print instruction into the second print instruction.

5. The print management device according to claim 2, wherein the selection unit includes the output device.

6. The print management device according to claim 2, further comprising an error processing unit that performs a predetermined error processing when the first processing device and the second processing device are not connected.

7. A method for managing print processes for obtaining a printed matter in a print system which processes a print job on the basis of print instructions having request items in the print processes, the request items described in each of the print instructions being defined by a predetermined description format, the method comprising:

receiving print instructions of the predetermined description format;

detecting a connection state of a plurality of processing devices, each of the plurality of processing devices executing a single process that is one of the request items, at least one of the plurality of processing devices executing the single process uses a first description format different from that of a second description format used by another of the plurality of processing devices executing the single process;

selecting a print instruction of the description format corresponding to the connected processing device to output the print instruction to the processing device; and if the connected processing device interprets the first description format, outputting to the connected processing device the received print instructions and if the connected processing device interprets the second description format, converting the print instructions to other print instructions defined by the second description format and outputting to the connected processing device the converted print instructions, wherein detecting a connection state includes detecting the connection state between a print management device and the plurality of processing devices, selecting a print instruction includes determining the description format which the processing device connected to the print management device can interpret, the first description format is a Job Definition Format (JDF), and the second description format is other than the JDF, and the print instructions defined by the first description format and the second description formal include information representing the relationship between the single process and another print process in the print job.

8. A method for managing print processes for obtaining a printed matter in a print system which processes a print job on the basis of first and second print instructions having request items in the print processes, the request items described in each of the first and second print instructions being defined by a predetermined description format, the method comprising:

receiving print instructions of the predetermined description format;

detecting a connection state of first and second processing devices, the first processing device interpreting the first print instruction to execute a single process that is one of the request items, the second processing device interpreting the second print instruction to execute the same single process as the first processing device, the second print instruction being different in the description format from the first print instruction; and outputting the first print instruction to the first processing device when the first processing device is connected, and requesting output of the second print instruction from an output device, which outputs the first print instruction and outputs the second print instruction corresponding to the first print instruction in response to a request, and outputting the second print instruction received from the output device to the second processing device when the second processing device is connected, wherein detecting a connection state includes detecting the connection state between a print management device and the first and second processing devices, and determining the description format which the processing device connected to the print management device can interpret, outputting includes, if the connected processing device interprets a first description format and the received print instructions are in the first description format, outputting the received print instructions to the connected processing device, and if the connected processing device interprets a second description format and the received print instructions are in the first description format, converting the print instructions to other print instructions defined by the second description format and outputting the converted print instructions to the connected processing device, the description format of the first print instruction is a Job Definition Format (JDF), and the description format of the second print instruction is other than the JDF, and the print instructions defined by the first description format and the second description format include information representing the relationship between the single process and another print process in the print job.

9. The print management method according to claim 8, wherein the request includes a notification to the output device that the second processing device is connected.

10. The print management method according to claim 8, wherein when the first processing device and the second processing device are not connected, a predetermined error processing is further performed.

11. A method for managing print processes for obtaining a printed matter in a print system which processes a print job on the basis of first and second print instructions having request items in the print processes, the request items described in each of the first and second print instructions being defined by a predetermined description format, the method comprising:

receiving print instructions of the predetermined description format;

detecting a connection state of first and second processing devices, the first processing device interpreting the first print instruction to execute a single process that is one of the request items, the second processing device interpreting the second print instruction to execute the same single process as the first processing device, the second print instruction being different in the description format from the first print instruction; and outputting the first print instruction to the first processing device when the first processing device is connected, and requesting output of the second print instruction from an output device, which outputs the first print instruction and outputs the second print instruction corresponding to the first print instruction in response to a request, and outputting the second print instruction received from the output device to the second processing device when the second processing device is connected, wherein detecting a connection state includes detecting the connection state between a print management device and the first and second processing devices, and determining the description format which the processing device connected to the print management device can interpret, outputting includes, if the connected processing device interprets a first description format and the received print instructions are in the first description format, outputting the received print instructions to the connected processing device, and if the connected processing device interprets a second description format and the received print instructions are in the first description format, converting the print instructions to other print instructions defined by the second description format and outputting the converted print instructions to the connected processing device, the description format of the first print instruction is a Job Definition Format (JDF), and the description format of the second print instruction is other than the JDF, and the print instructions defined by the first description format and the second description format include information representing the relationship between the single process and another print process in the print job.

12. A computer readable storage medium encoded with a print management program executable by a computer to perform a processing of managing print processes for obtaining a printed matter in a print system which processes a print job on the basis of print instructions having request items in the print processes, the request items described in each of the print instructions being defined by a predetermined description format, the processing comprising:

receiving print instructions of the predetermined description format;

detecting a connection state of a plurality of processing devices, each of the plurality of processing devices executing a single process that is one of the request items, at least one of the plurality of processing devices executing the single process uses a first description format different from that of a second description format used by another of the plurality of processing devices executing the single process;

selecting a print instruction of the description format corresponding to the connected processing device to output the print instruction to the processing device; and if the connected processing device interprets the first description format, outputting to the connected processing device the received print instructions and if the connected processing device interprets the second description format, converting the print instructions to other print instructions defined by the second description format and outputting to the connected processing device the converted print instructions, wherein detecting a connection state includes detecting the connection state between a print management device and the plurality of processing devices, selecting the print instruction includes determining the description format which the processing device connected to the print management device can interpret, the first description format is a Job Definition Format (JDF), and the second description format is other than the JDF, and the print instructions defined by the first description format and the second description format include information representing the relationship between the single process and another print process in the print job.

13. A computer readable storage medium encoded with a print management program executable by a computer to perform a processing of managing print processes for obtaining a printed matter in a print system which processes a print job on the basis of first and second print instructions having request items in the print processes, the request items described in each of the first and second print instructions being defined by a predetermined description format, the processing comprising:

receiving print instructions of the predetermined description format;

detecting a connection state of first and second processing devices, the first processing device interpreting the first print instruction to execute a single process that is one of the request items, the second processing device interpreting the second print instruction to execute the same single process as the first processing device, the second print instruction being different in the description format from the first print instruction; and outputting the first print instruction to the first processing device when the first processing device is connected, and requesting output of the second print instruction from an output device, which outputs the first print instruction and outputs the second print instruction corresponding to the first print instruction in response to a request, and outputting the second print instruction received from the output device to the second processing device when the second processing device is connected, wherein detecting a connection state includes detecting the connection state between a print management device and the first and second processing devices, and determining the description format which the processing device connected to the print management device can interpret, outputting includes, if the connected processing device interprets a first description format and the received print instructions are in the first description format, outputting the received print instructions to the connected processing device, and if the connected processing device interprets a second description format and the received print instructions are in the first description format, converting the print instructions to other print instructions defined by the second description format and outputting the converted print instructions to the connected processing device, the description format of the first print instruction is a Job Definition Format (JDF), and the description format of the second print instruction is other than the JDF, and the print instructions defined by the first description format and the second description format include information representing the relationship between the single process and another print process in the print job.

14. The storage medium according to claim 13, wherein the requesting comprises notifying the output device that the second processing device is connected.

15. The storage medium according to claim 13, wherein the processing further comprises performing a predetermined error processing when the first processing device and the second processing device are not connected.

16. A computer readable storage medium encoded with a print management program executable by a computer to perform a processing of managing print processes for obtaining a printed matter in a print system which processes a print job on the basis of first and second print instructions having request items in the print processes, the request items described in each of the first and second print instructions being defined by a predetermined description format, the processing comprising:

receiving print instructions of the predetermined description format;

detecting a connection state of first and second processing devices, the first processing device interpreting the first print instruction to execute a single process that is one of the request items, the second processing device interpreting the second print instruction to execute the same single process as the first processing device, the second print instruction being different in the description format from the first print instruction; and outputting the first print instruction to the first processing device when the first processing device is connected, and requesting output of the second print instruction from an output device, which outputs the first print instruction and outputs the second print instruction corresponding to the first print instruction in response to a request, and outputting the second print instruction received from the output device to the second processing device when the second processing device is connected, wherein detecting a connection state includes detecting the connection state between a print management device and the first and second processing devices, and determining the description format which the processing device connected to the print management device can interpret, outputting includes, if the connected processing device interprets a first description format and the received print instructions are in the first description format, outputting the received print instructions to the connected processing device, and if the connected processing device interprets a second description format and the received print instructions are in the first description format, converting the print instructions to other print instructions defined by the second description format and outputting the converted print instructions to the connected processing device, the description format of the first print instruction is a Job Definition Format (JDF), and the description format of the second print instruction is other than the JDF, and the print instructions defined by the first description format and the second description format include information representing the relationship between the single process and another print process in the print job.

17. A print system which processes a print job on the basis of print instructions having request items in print processes for obtaining a printed matter, the request items described in each of the print instructions being defined by a predetermined description format, the system comprising:

a plurality of processing devices for executing a single process that is one of the request items, one of the plurality of processing devices executing the single process uses a first description format different from that of a second description format used by another of the plurality of processing devices executing the single process;

a receiving unit that receives the print instructions;

a detection unit for detecting a connection state of the plurality of processing device;

a selection unit for selecting a print instruction having a request item defined by a description format corresponding to the connected processing device to output the print instruction to the processing device; and an output unit that if the connected processing device interprets the first description format, outputs to the connected processing device the received print instructions, and if the connected processing device interprets the second description format, converts the print instructions to other print instruction having request items defined by the second description format and outputs to the connected processing device the converted print instructions, wherein the detection unit detects the connection state between a print management device and the plurality of processing devices, the selection unit determines the description format which the processing device connected to the print management device can interpret, the first description format is a Job Definition Format (JDF), and the second description format is other than the JDF, and the print instructions defined by the first description format and the second description format include information representing the relationship between the single process and another print process in the print job.

18. A print management system which processes a print job on the basis of first and second print instructions having request items in print processes for obtaining a printed matter, the request items described in each of the first and second print instructions each being defined by a predetermined description format, the system comprising:

a first processing device that interprets the first print instruction having a request item to execute a single process;

a second processing device that interprets the second print instruction having a request item to execute the same single predetermined process as the first processing device, the second print instruction having a request item defined by a different description format from the first print instruction;

a receiving unit that receives print instructions;

a detection unit that detects a connection state of the first and second processing devices;

a selection unit that outputs the first print instruction to the first processing device when the first processing device is connected, and requests output of the second print instruction from an output device, which outputs the first print instruction and outputs the second print instruction corresponding to the first print instruction in response to a request, and outputs the second print instruction received from the output device to the second processing device when the second processing device is connected; and an output unit that, if the connected processing device interprets a first description format, outputs to the connected processing device the received print instructions, and if the connected processing device interprets a second description format, converts the print instructions to other print instructions having request items defined by the second description format and outputs to the connected processing device the converted print instructions, wherein the detection unit detects the connection state between the print management device and the plurality of processing devices, the selection unit determines the description format which the processing device connected to the print management device can interpret, the description format of the first print instruction is a Job Definition Format (JDF), and the description format of the second print instruction is other than the JDF, and the print instructions defined by the first description format and the second description format includes information representing the relationship between the single process and another print process in the print job.

19. A print management device comprising:

a receiving unit that receives a first print instruction in which a predetermined processing is described in description format of JDF;

a detection unit that receives, respectively from at least one processing device which is connected to the print management device, information on a function of the at least one processing device and information on whether the at least one processing device is able to interpret description format of JDF or description format other than YDF, and detects a connection state of at least one processing device; and an output unit that a) if a first processing device, which is able to interpret JDF and is able to perform the predetermined processing, is detected from among the at least one processing device, outputs the first print instruction to the first processing device, and b) if a first processing device, which is able to interpret JDF and is able to perform the predetermined processing, is not detected, and a second processing device, which is able to interpret description format other than JDF and is able to perform a processing substantially the same as the predetermined processing, is detected, converts the first print instruction to a second print instruction described in the description format other than JDF, and outputs the second print instruction to the second processing device.

20. The print management device according to claim 1, wherein the description format other than JDF is XML.

21. The print management device according to claim 2, wherein the description format other than JDF is XML.

22. The method according to claim 7, wherein the description format other than JDF is XML.

23. The method according to claim 8, wherein the description format other than JDF is XML.

24. The method according to claim 11, wherein the description format other than JDF is XML.

25. The computer readable storage medium according to claim 12, wherein the description format other than JDF is XML.

26. The computer readable storage medium according to claim 13, wherein the description format other than JDF is XML.

27. The computer readable storage medium according to claim 16, wherein the description format other than JDF is XML.

28. The print system according to claim 17, wherein the description format other than JDF is XML.

29. The print management system according to claim 18, wherein the description format other than JDF is XML.

30. The print management device according to claim 19, wherein the description format other than JDF is XML.

* * * * *